United States Patent Office 2,893,921
Patented July 7, 1959

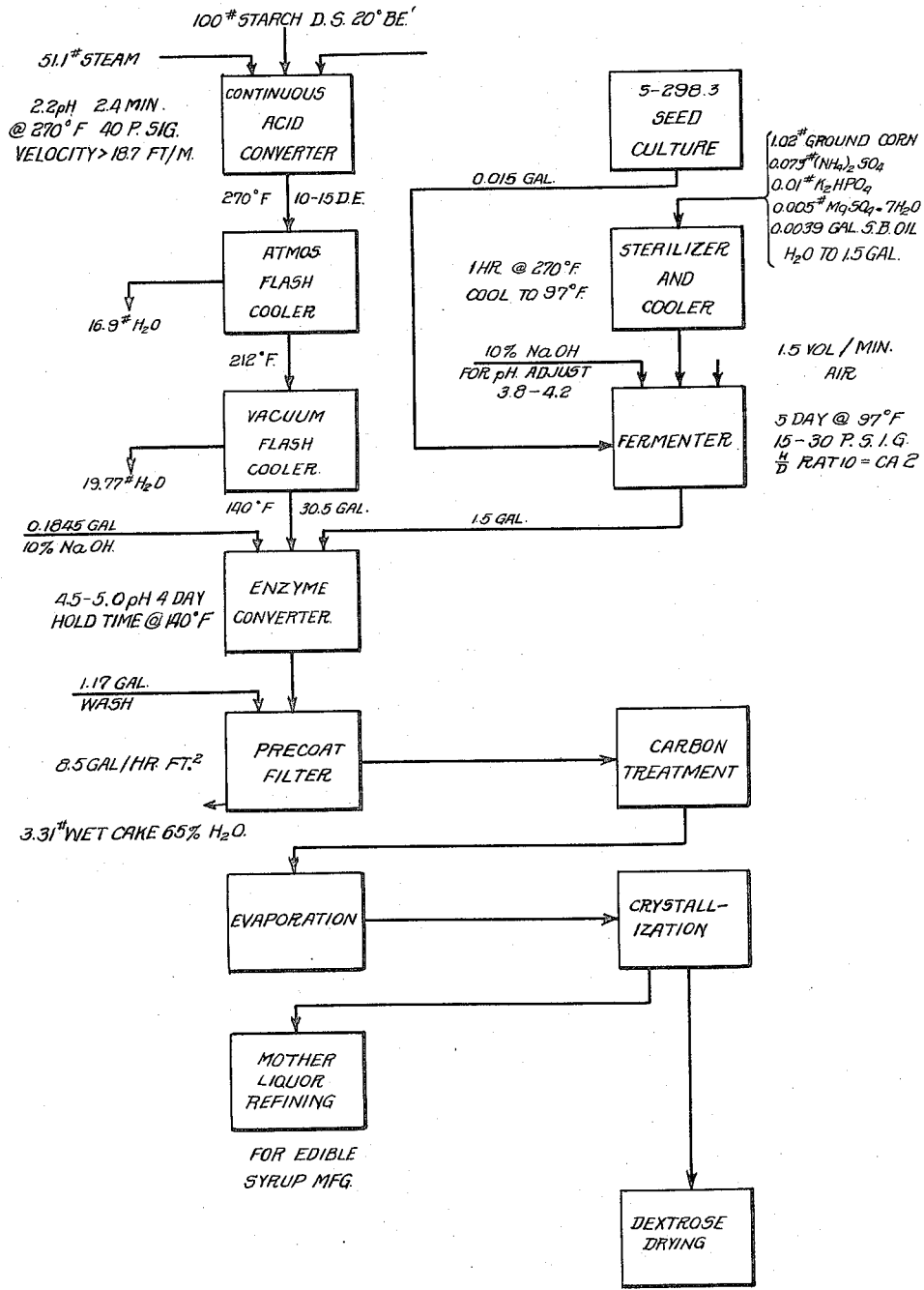

2,893,921
PRODUCTION OF AMYLOGLUCOSIDASE

David P. Langlois and Willard Turner, Decatur, Ill., assignors to A. E. Staley Manufacturing Company, Decatur, Ill., a corporation of Delaware Application January 12, 1955, Serial No. 481,376

2 Claims. (Cl. 195—66)

This invention relates, generally, to the production of amyloglucosidase which is particularly useful for producing crystalline dextrose from starch. The invention relates more particularly to certain innovations and improvements in techniques of culturing members of the *Aspergillus niger* group, especially *A. phoenicis* (Staley 298), ATCC 13156, to produce an active inoculum and in the use of the resulting vegetative inoculum under particular conditions of pH control to produce much higher yields of amyloglucosidase than have been obtained by other techniques. The *Aspergillus niger* group is described in chapter 17 of "A Manual of the Aspergilli" by Thom and Raper (1945, The Williams & Wilkins Company, Baltimore, Md.).

While the present invention is useful with members of the *Aspergillus niger* group broadly, outstanding results are obtained with *A. phoenicis* (Staley 298).

Four unique features of the present invention will be briefly stated with specific reference to *A. phoenicis* (Staley 298). First, an active vegetative inoculum of this organism prepared by serially transferring it gives higher yields of amyloglucosidase than other inoculums of the same organism. Second, cultivating this organism under specific conditions of pH control, as hereinafter described, gives higher yields of amyloglucosidase than were obtained by other methods of cultivation. Third, the combination of the serial transfer technique and the pH control technique gives higher yields of amyloglucosidase than those obtained by either serial transfer or pH control alone. Fourth, when the serial transfer and pH control techniques are combined and substrates of the composition described below are employed, maximum yields of amyloglucosidase are obtained.

The object of the invention, generally stated, is the economical production in high yields of amyloglucosidase which is particularly useful for efficiently digesting starch to dextrose and edible high D.E. syrups without formation of appreciable quantities of intermediate products such as maltose, maltotriose or dextrin.

An important object of this invention is the production of a vegetative inoculum characterized by its ability to produce high yields of an amyloglucosidase enzyme from low-cost, readily available materials under a wide variety of environmental and nutritional conditions, and without commercially objectionable amounts of color and bitter-imparting substances being formed.

An important object of the invention is the use of low-cost farinaceous materials such as corn, wheat, oats and barley, and particularly yellow dent corn, as the source of assimilable carbon in the submerged cultivation of certain organisms, particularly *A. phoenicis* (Staley 298) to produce large yields of amyloglucosidase.

Certain other objects of the invention will, in part, be obvious and will, in part, appear hereinafter.

For a more complete understanding of the nature and scope of the invention, reference may now be had to the following detailed description thereof, wherein certain illustrative embodiments of the invention are set forth. Reference will also be made to the accompanying drawing which contains a flow sheet for producing crystalline dextrose according to this invention.

*A. phoenicis* (Staley 298) may be isolated from yellow dent corn or other suitable grains by known techniques using, for example, medium of the following composition:

| | | |
|---|---|---|
| Corn starch | grams | 1.5 |
| Beef extract | do | 0.3 |
| Peptone | do | 0.5 |
| Agar | do | 1.5 |
| Water | ml | 100 |

One technique is to shake 12 kernels of corn in 100 ml. of the sterilized, melted medium to remove the spores of *A. phoenicis* from the corn. The supernatant medium containing the spores is then poured into sterile Petri dishes, allowed to solidify and incubated at 32° C. for 5 days. The black Aspergilli that grow on the incubated medium are further isolated by transplanting the spores of individual colonies to fresh medium and incubating again as before. The isolates are then observed for their morphological characteristics.

Those isolates demonstrating the cultural and morphological characteristics shown in Table 1 below for *A. phoenicis* (Staley 298) are considered to be strains of this species. They are then tested for their amyloglucosidase-producing ability. Only the strains producing about 75 units of enzyme per ml. of culture during 5 days of incubation are retained as stock cultures of *A. phoenicis*.

One unit of the amyloglucosidase enzyme was taken as that amount of the enzyme required to digest one-tenth gram of starch essentially to dextrose in 48 hours at a pH of 4.0 and at a temperature of 55° C. The enzyme liquors were assayed using 4% starch solution thinned with 0.05 gram Bjorksten alpha amylase per 80 grams of starch. The starch solution was first buffered with 10 cc. of aqueous sodium acetate per liter of the starch solution. The aqueous sodium acetate was prepared by dissolving 10 grams of sodium acetate heptahydrate in 100 cc. of water and adding enough glacial acetic acid to adjust the pH to 4.0. The enzyme conversions were carried out at 55° C. for 48 hours.

TABLE 1

Colony characters:
 Rate of growth—rapid
 Texture—uncrowded conidiophores
 Color—chocolate brown, white edge, reverse, white
Heads:
 Color—chocolate brown
 Form—globose
 Measurements—240–960 microns
Conidiophore:
 Length—1920–3850 microns
 Diameters—17–25 microns
 Walls—thickness 1.7–3.3 microns
 Markings—none
 Color—none
Vesicle:
 Shape—globose
 Size—71–108 microns
 Color—none
Primary sterigmata:
 Measurement—25.46 microns x 4.2–1.3 microns
 Arrangement—fertile over entire area
 Color—none
Secondary sterigmata: Measurement—10 microns x 3.3 microns
Conidia:
 Color—dark to colorless
 Measurement—4.2 microns
 Markings—slightly rough
(Perithecia, sclerotia and ascospores—absent)

Monospore isolates of the stock cultures of *A. phoenicis* (Staley 298) may be prepared by known techniques. Strains so isolated are less apt to be contaminated with other molds. They have also been found to produce more amyloglucosidase. One such monospore isolate which has given outstanding yields of amyloglucosidase has been identified as *A. phoenicis* (Staley 298.3), ATCC 13157, and this strain has the cultural and morphological characteristics shown in Table 2 below:

TABLE 2

| Characteristics | *A. phoenicis* (Staley 298.3) |
|---|---|
| Conidia color | Purple-brown. |
| Mycelium color | White. |
| Pigmentation of Czapek's agar | Usually colorless. |
| Conidiophore length, Microns | 1,900–3,850. |
| Conidiophore wall-thickness, Microns | 3–4. |
| Conidiophore diameter, Microns | 18–25. |
| Conidiophore texture, Microns | Uncrowded. |
| Head diameter, Microns | 230–960. |
| Vesicle diameter, Microns | 50–110 globose. |
| Primary sterigmata length, Microns | 33. |
| Secondary sterigmata length, Microns | 11. |
| Conidia diameter, Microns | 3–5 rough. |
| Four-day Czapek's agar, colony size at 30° C., millimeters. | 68. |
| Alpha amylase production, u./ml | 0–0.1. |
| Amyloglucosidase production, u./ml | 90–100. |
| Liquor color | Light straw. |
| Liquor flavor | Acid-mild bitter. |

EXAMPLE 1

*Preparation of master cultures*

Czapek's solution agar, have the following composition, is prepared by mixing all the ingredients together except the sucrose (to avoid over-heating the sucrose) and autoclaving them for five minutes at 15 p.s.i.g. (pounds per square inch gauge) of steam to dissolve the agar:

| | |
|---|---|
| $NaNO_3$ | grams 3.0 |
| $K_2HPO_4.3H_2O$ | do 1.0 |
| $MgSO_4.7H_2O$ | do 0.5 |
| KCl | do 0.5 |
| $FeSO_4.7H_2O$ | do 0.01 |
| Sucrose (good grade) | do 30.0 |
| Agar | do 15.0 |
| Water | ml 1,000 |

After autoclaving, the sucrose is then dissolved in the mixture and 5 ml. (milliliters) of the solution is dispensed into each of the required number of 18 x 150 mm. Pyrex tubes. The tubes are then closed with cotton plugs and sterilized at 15 p.s.i.g. of steam pressure for 20 minutes. Upon removing the tubes from the autoclave they are placed in a reclining position so that the surface area of the medium is increased after gelation. The stock of medium thus prepared is stored at 3–10° C. and is replaced with fresh medium each month.

A 30-day supply of fresh master culture, *A. Phoenicis* (Staley 298 or 298.3) is prepared each month by transplanting some of the spores from master cultures prepared the previous month into fresh tubes of Czapek's solution agar medium under aseptic conditions. The inoculated tubes are incubated for 4–5 days at 30–35° C. or until a heavy growth of spores appears. The mature master cultures are stored at 3–10° C. Old, unused master cultures are discarded.

*Preparation of vegetative inoculum*

The following vegetative inoculum broth ingredients are mixed together in the proportions indicated and enough KOH is added to bring the pH to 7.0:

| | |
|---|---|
| Whole ground yellow corn | 5 grams. |
| Corn steep water solids | 5 grams. |
| Pure food powdered starch | 2 grams. |
| KOH | For pH adjustment to pH 7.0 |
| Water | 1000 ml. |

One hundred ml. of the mixture is placed in each of the required number of 500 ml. flasks. The flasks are then closed with cotton plugs and sterilized at 15 p.s.i.g. of steam pressure for 30 minutes. The flasks are then cooled and stored at room temperature.

Six days prior to the time that a batch is to be started for the production of amyloglucosidase a tube of master culture is opened and one-fifth of it deposited in a flask of the above vegetative inoculum broth. The flask is then placed on the reciprocating shaker (7" stroke, 78 r.p.m.) and incubated for 24 hours at 30–35° C. At the end of this time 10 ml. of the vegetative culture is transplanted to a second flask of vegetative inoculum broth and likewise agitated and incubated. This is repeated on each of four more days. At this time five transfers of vegetative culture will have been made. The mature 24-hour culture obtained from the fifth transfer is then used as vegetative inoculum.

*Production of amyloglucosidase*

A medium for the production of amyloglucosidase is prepared by mixing with tap water 2000 g. of ground yellow dent corn, 140 g. of $(NH_4)_2SO_4$, 10 g. of $MgSO_4.7H_2O$, 20 g. of $K_2HPO_4.3H_2O$ and diluting the same with tap water to a volume of 20 liters. The pH of this medium is adjusted as required to between 5.8 to 6.2 and is placed in a ten gallon fermentor equipped to provide agitation and aeration under pressure with sterilized air. The mixture is then sterilized by direct steam at 121° C. (15 p.s.i.g. of steam) for one hour with agitation and cooled to 36° C. by applying cool water in the fermentor jacket and bubbling sterile air through the medium. Two hundred ml. of the vegetative inoculum prepared as described above is then added aseptically to the sterilized medium in the fermentor. The batch is incubated at 36° C. with agitation and aeration with 20 liters per minute of sterile air at 15 p.s.i.g. for 5 to 7 days. During the incubation period the pH is allowed to drop to 4.0 and it is maintained in the range of 3.8 to 4.2 by the periodic aseptic addition of 10% NaOH. At the end of the incubation period the batch is drained from the fermentor. It is not necessary to filter the mycelium out of the batch prior to using it to produce dextrose. However, it can be filtered on a filter press and concentrated in vacuo before use in producing dextrose. If desired the enzyme may be precipitated with alcohol or salts in known manners. The amyloglucosidase obtained may be used according to the following process to produce crystalline dextrose from starch.

*Hydrolysis of starch*

A 20° Bé. slurry of corn starch was acid-converted at 2.2 pH under 30 to 40 p.s.i.g. of steam pressure for 2.5 minutes to about 10–15 D.E. The pH of the starch substrate was adjusted to 4.1 and an amount of whole *A. phoenicis* (Staley 298 or 298.3) culture equivalent to 10 units of amyloglucosidase per gram of starch as drawn off from the fermentor without filtering was added and the enzyme allowed to act on the substrate for 48 hours at 60° C. The resulting syrup had a D.E. of 91–93, and contained 89–90% dextrose and 1–4% higher sugars (maltose and trioses) with practically no dextrin.

The improvement in the vegetative inoculum obtained by serially transferring the organism is shown in the following table wherein the enzyme content of the culture broth obtained after five serial transfers in Example 1 is compared with the potency of the inoculum obtained after one transfer.

TABLE 1
EFFECT OF SERIAL TRANSFER ON AMYLOGLUCOSIDASE YIELDS

| Fermentor | No. Serial Transfers | 120 hr. potency, units/ml. |
|---|---|---|
| A | 1 | 40 |
| A | 5 | 78 |
| B | 1 | 50 |
| B | 5 | 85 |

As stated above, the yields of amyloglucosidase may be greatly increased by cultivating the organism under certain specific conditions of pH control. This is shown by the results presented in the following table obtained by cultivating the *A. phoenicis* (Staley 298) as described under Production of Amyloglucosidase, Example 1, but with the pH conditions being as indicated:

TABLE 2
EFFECT OF pH CONTROL ON AMYLOGLUCOSIDASE YIELDS

| Variation | 120 hr. potency, units/ml. |
|---|---|
| Inoculated and held at pH 7 | 18 |
| Inoculated and held at pH 6 | 78 |
| Inoculated and held at pH 5 | 74 |
| Inoculated and held at pH 4 | 75 |
| Inoculated at pH 6 with no pH control (final pH 3) | 53 |
| Inoculated at 5.9 pH let drop to 4 pH and held | 91 |

Combining the serial transfer technique and the pH control results in the highest yields of amyloglucosidase. While the composition of the substrate is apparently not as noteworthy as are the serial transfer and pH control techniques, nevertheless it is important and maximum yields were obtained with the substrate composition of Example 1.

On the basis of extensive tests, the following conclusions regarding the process may be made:

With respect to the medium used for the production of amyloglycosidase, ground yellow dent corn is the preferred source of carbon, but white corn, potatoes, starch, ground oats, barley, wheat, corn syrup, dextrose or mixtures of one or more of these ingredients can be used reasonably successfully. When ground yellow dent corn is used the concentration of the corn in the medium can vary from 5–15% by weight. Ground yellow corn gives the highest yields of enzyme per pound of material used. Because of its high yield efficiency and its availability at low cost, yellow dent corn is the preferred source of carbon.

The nitrogen source can be corn, oats, wheat, barley, ammonium sulfate, ammonium nitrate or sodium nitrate. Because it produces the highest yields and is readily available at low cost, the preferred source of nitrogen is $(NH_4)_2SO_4$ used at a concentration of from 0.1–2.0% by weight. The preferred concentration is 0.7%.

The magnesium source can be corn, oats, wheat, barley or magnesium salts. Because it produces the highest yields and is readily available at low cost, the preferred source of magnesium is magnesium sulfate heptahydrate used at a concentration of from 0.01–0.10%, the preferred concentration being 0.05%. The potassium and phosphate sources also can be corn, oats, wheat or barley. However, a preferred source is dipotassium hydrogen phosphate trihydrate, used at a concentration of 0.01–0.20%, the preferred concentration being 0.10%. This salt constitutes a source of both potassium and phosphorus, gives high yields and is readily available at low cost.

Preferably, from 1.0–2.0% by volume of the vegetative inoculum of *A. phoenicis* is introduced into the medium for the production of amyloglycosidase. However, the concentration of inoculum used may range from 0.5–10.0% by volume. Instead of using the vegetative inoculum conditioned by serially transferring it on each of two to five consecutive days, spore inoculum can be used but lower yields of amyloglucosidase are obtained.

The preferred aeration conditions are approximately 15 p.s.i.g. and about 1.5 volume of air per minute with agitation. The pressure may range from 5 to 30 p.s.i.g., and air flows up to 2 volumes of air per minute with suitable agitation are useful.

The pH of the culture medium is preferably adjusted to between 5.8–6.2 prior to inoculation. Thereafter it is allowed to drop to 3.8–4.2 as the culture produces acid. After the pH has dropped to within this range, the additional amounts of acid produced by the culture are neutralized by periodic addition of sodium hydroxide so as to maintain the pH in the range of from 3.8–4.2.

The temperature of incubation may vary from 20–40° C. but preferably the temperature is held between the range of 30° C. and 38° C. The period of incubation may range from three to nine days but the preferred time is from five to seven days. Usually the culture is filtered at the end of the incubation period to avoid autolysis and amyloglucosidase destruction. However, if the amyloglucosidase is to be used immediately for digesting starch, filtration is not necessary.

The amyloglucosidase liquors may be concentrated in vacuo from 15–25° Bé. for storage. During the concentration the temperature of the liquor should not exceed 25–40° C. The concentrated liquor is stored at 3–10° C. Excessively long storage periods should be avoided to prevent spoilage.

Results have been obtained with other organisms which show that members of the *Aspergillus niger* group generally respond in the same manner as *A. phoenicis* (Staley 298). However, this latter organism has produced much higher yields of amyloglucosidase and for this reason it is preferred in producing crystalline dextrose from starch. Other members of the *Aspergillus niger* group which have been tested in addition to *A. phoenicis* (Staley 298) and *A. phoenicis* (Staley 298.3) include *A. niger* NRRL 330, *A. niger* NRRL 337, *A. niger* ATCC 6277, *A. niger* ATCC 7983, *A. niger* NRRL 334, *A. phoenicis* NRRL 1956, *A. awamori* NRRL 2042, *A. niger* ATCC 10582, *A. foetidus* NRRL 341, *A. niger* mut. *Cinnamomeus* NRRL 348, and *A. niger* mut. *Schiemanni* NRRL 361.

Reference may now be had to the flow diagram shown in the accompanying drawing for a description of a commercial process for manufacturing crystalline dextrose in accordance with the present invention. The legends on the flow sheet make it largely self-explanatory. Starch slurry is first converted with acid in a continuous acid converter of known type to 10–15 D.E. After passing through an atmospheric flash cooler and a vacuum flash cooler to a temperature of about 140° F., the starch slurry is introduced into an enzyme converter.

A vegetative inoculum of *A. phoenicis* (Staley 298.3) or *A. phoenicis* (Staley 298) is prepared as described above and introduced into a fermentor equipped for submerged fermentation along with sterilized and cooled nutrient medium of the composition shown on the drawing. The submerged fermentation is conducted under the conditions indicated and the resulting amyloglucosidase liquor is either introduced directly into the enzyme converter or first processed to produce a purified enzyme.

After approximately 48 hours digestion at 140° F. in the enzyme converter, the batch is drawn off into a suitable filter to remove the mycelium, corn bran, and other solids from the dextrose liquor and the clarified dextrose liquor is subjected to suitable carbon treatment, evaporization, crystallization and centrifugation conducted according to known conditions and in known equipment. The dextrose is dried and packaged while the mother liquor is refined and used or set aside for edible syrup manufacture.

In view of the foregoing disclosure, those skilled in the art will be able to practice the invention either by following the embodiments given or such other embodiments or modifications of the invention as will be apparent. Accordingly, all matter disclosed above is intended to be interpreted as illustrative and not in a limiting sense.

What is claimed as new is:

1. In the process of producing amyloglucosidase the improvement which comprises: (1) preparing an active inoculum of *Aspergillus phoenicis* selected from the group consisting of ATCC 13156 and ATCC 13157, transplanting and cultivating said fungus under conditions of submerged cultivation in an inoculum broth and serially transplanting, incubating, agitating and aerating the resulting vegetative culture in additional quantities of inoculum broth on each of at least two consecutive days; and (2) transplanting and cultivating said culture under conditions of submerged cultivation in a nutrient medium having a pH in the range of about 5.8–6.2 prior to inoculation and after having decreased to about 3.8–4.2 maintaining the pH in this latter range by additions of alkali, said nutrient medium consisting essentially of a relatively large amount of ground corn and small concentrations of salts providing the ammonium, magnesium, potassium and phosphate ions.

2. In the process of producing amyloglucosidase the improvement which comprises inoculating an aqueous medium consisting of a mixture of about 10% by weight of ground yellow dent corn, about 0.7% by weight of $(NH_4)_2SO_4$, about 0.05% by weight of $MgSO_4 \cdot 7H_2O$ and about 0.10% by weight of $K_2HPO_4 \cdot 3H_2O$ with a vegetative inoculum of *Aspergillus phoenicis*, selected from the group consisting of ATCC 13156 and ATCC 13157 which has been prepared by serially transplanting and cultivating the same on from four to five consecutive days, and fermenting said aqueous medium for about six to seven days under conditions of submerged cultivation wherein the temperature is maintained in the range of about 30–38 C., about 1.5 volume of air per minute at about 15 p.s.i.g. is sparged through the medium with agitation, and the pH of the fermenting medium is allowed to drop from an initial value of about 5.8–6.2 to between about 3.8–4.2 within which range it is thereafter maintained by periodic additions of NaOH.

References Cited in the file of this patent

UNITED STATES PATENTS 2,557,078    Corman _____ June 19, 1951

FOREIGN PATENTS 346,361    Great Britain _____ of 1931

OTHER REFERENCES

Thom et al.: Manual of the Aspergilli, 1945, Williams and Wilkins, pages 214, 215, 222, 223.

Schwimmer: Jour. Biol. Chem. 161 (1945), pages 219–234.

Corman et al.: Cereal Chem. 25 (1948), pages 190–200.

Corman et al.: Cereal Chem. 28 (1951), pages 280–288.

Phillips et al.: Jour. Am. Chem. Soc. 73 (July–Sept. 1951), pages 3559–3565.

Le Mense et al.: "Ind. & Eng. Chem.," vol. 41 (1949), pages 100 to 103.

Foster: "Chemical Activity of Fungi," 1949, published by Academic Press Inc. (New York), page 59.